United States Patent
Zaitsu et al.

(10) Patent No.: US 8,086,284 B2
(45) Date of Patent: Dec. 27, 2011

(54) PORTABLE ELECTRONIC DEVICE AND PORTABLE TELEPHONE WITH ELECTROACOUSTIC TRANSDUCER MOUNTING

(75) Inventors: Masayuki Zaitsu, Kanagawa (JP); Kouichi Hisada, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 757 days.

(21) Appl. No.: 12/035,975

(22) Filed: Feb. 22, 2008

(65) Prior Publication Data
US 2008/0207283 A1 Aug. 28, 2008

(30) Foreign Application Priority Data

Feb. 26, 2007 (JP) ................................. 2007-045210

(51) Int. Cl.
*H04M 1/00* (2006.01)
*H05K 5/00* (2006.01)

(52) U.S. Cl. ................................ 455/575.1; 361/679.01

(58) Field of Classification Search ............... 455/575.1, 455/575.3, 575.4, 575.8; 361/600, 679.01
See application file for complete search history.

(56) References Cited

U.S. PATENT DOCUMENTS

| | | | | |
|---|---|---|---|---|
| 7,248,903 | B2 * | 7/2007 | Yoda .......................... | 455/575.1 |
| 7,787,915 | B2 * | 8/2010 | Uejima et al. ............. | 455/575.3 |
| 2003/0181225 | A1 * | 9/2003 | Hasegawa et al. ............ | 455/566 |
| 2005/0136969 | A1 * | 6/2005 | Park .......................... | 455/550.1 |
| 2006/0057966 | A1 * | 3/2006 | Mise et al. .................. | 455/67.13 |
| 2006/0258325 | A1 | 11/2006 | Tsutaichi et al. | |

FOREIGN PATENT DOCUMENTS

| | | |
|---|---|---|
| CN | 2638246 Y | 9/2004 |
| CN | 1838833 A | 9/2006 |
| JP | 11-088484 | 3/1999 |

OTHER PUBLICATIONS

First Office Action dated Oct. 26, 2010 issued for counterpart Chinese Application No. 200810081363.7.

* cited by examiner

*Primary Examiner* — George Eng
*Assistant Examiner* — Christopher M Bradnt
(74) *Attorney, Agent, or Firm* — Procopio, Cory, Hargreaves & Savitch LLP

(57) ABSTRACT

A portable electronic device includes a cover, and a casing engaged with the cover to form a space between the cover and the casing. The portable electronic device also includes a first mounting substrate in the space and an electroacoustic transducer between the first mounting substrate and the casing. The electroacoustic transducer converts from one of an audio and an electric signal into the other.

15 Claims, 12 Drawing Sheets

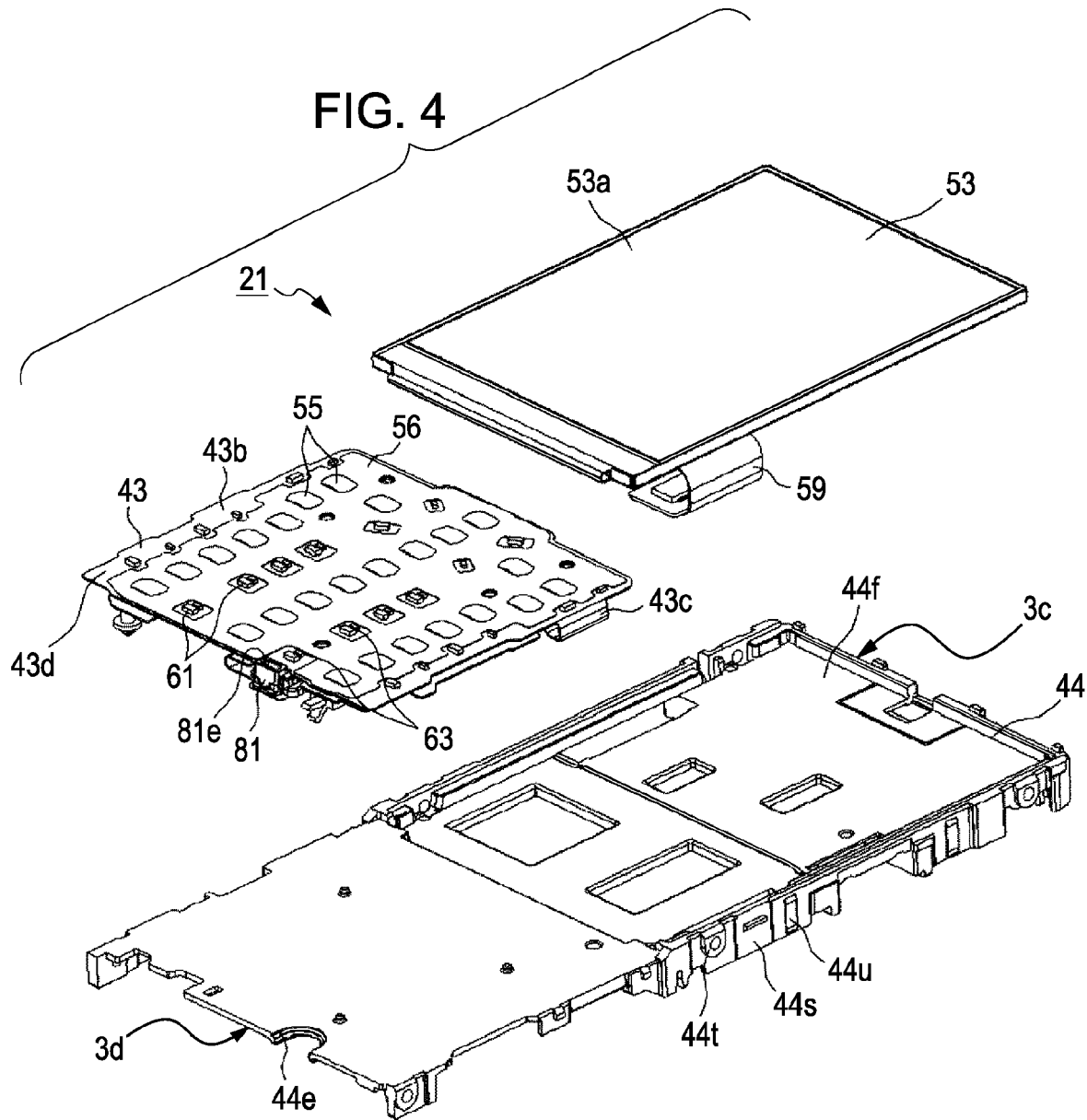

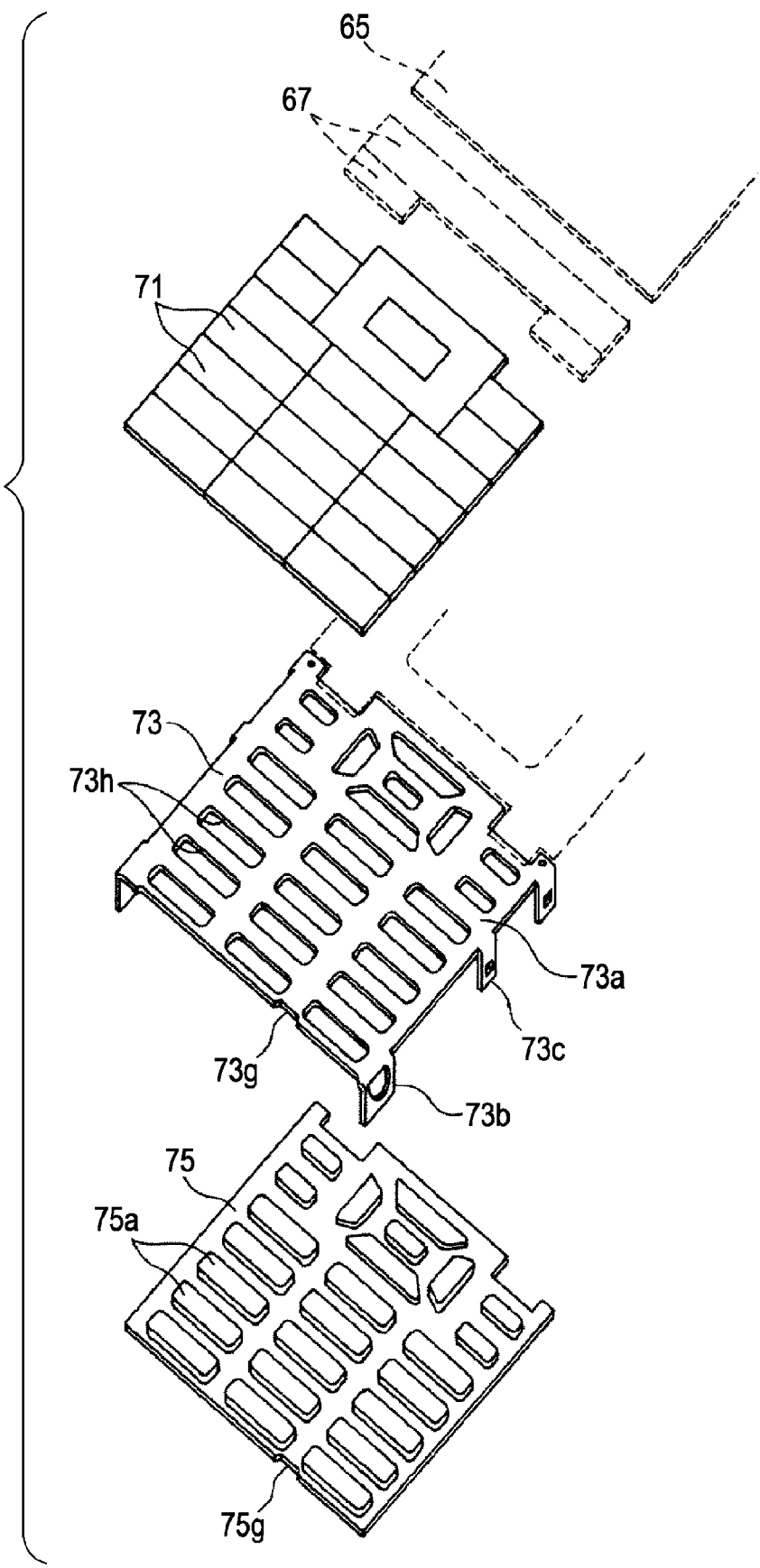

PORTABLE ELECTRONIC DEVICE AND PORTABLE TELEPHONE WITH ELECTROACOUSTIC TRANSDUCER MOUNTING

CROSS-REFERENCE TO RELATED APPLICATION

This application claims priority under 35 U.S.C. §119 to Japanese Patent Application No. 2007-45210, filed on Feb. 26, 2007, the contents of which are incorporated herein by reference in its entirety.

BACKGROUND OF THE INVENTION

1. Field of the Invention

The present invention relates to portable electronic devices equipped with electroacoustic transducers such as microphones and speakers. The present invention also relates to portable telephones.

2. Description of the Related Art

There have been proposed various types of electronic devices equipped with substrates having a plurality of switches mounted thereon and with electroacoustic transducers such as microphones. For example, a typically known portable telephone has key tops exposed on a front face of a casing, a plurality of switches that are pushable using the key tops, and a microphone disposed outside the area having the key tops (i.e., the switches). Japanese Unexamined Patent Application Publication No. 2006-262262 discloses an example of such a portable telephone. The portable telephone disclosed in Japanese Unexamined Patent Application Publication No. 2006-262262 is equipped with a substrate that faces an inner surface of the front-face section of the casing. This substrate has the plurality of switches provided thereon. A section of the substrate outside the area having the switches and the inner surface of the front-face section of the casing sandwich a microphone therebetween, such that a sound pickup face of the microphone is oriented towards the front face and a terminal of the microphone disposed on the opposite side of the sound pickup face is connected to the substrate. Accordingly, the microphone having the sound pickup face and the terminal at the opposite sides thereof can be attached to the portable telephone with a simple configuration.

In Japanese Unexamined Patent Application Publication No. 2006-262262, the microphone is disposed on a mounting surface that is flush with a mounting surface having the switches thereon. For this reason, the microphone must be disposed outside the area having the switches. In other words, the casing needs to have a size that allows the area having the switches and the microphone to be arranged in parallel to each other (in the longitudinal direction of the portable telephone) on the same surface. This makes it difficult to achieve compactness of the casing.

BRIEF DESCRIPTION OF THE DRAWINGS

FIG. 4 is an exploded perspective view of a part of the internal assembly unit of the portable telephone in FIG. 1 as viewed from the front side of the main body of the portable telephone;

FIG. 5 is an exploded perspective view of an operating unit of the portable telephone in FIG. 1, as viewed from the front side of the main body of the portable telephone;

DESCRIPTION OF THE PREFERRED EMBODIMENTS

Figure 1:
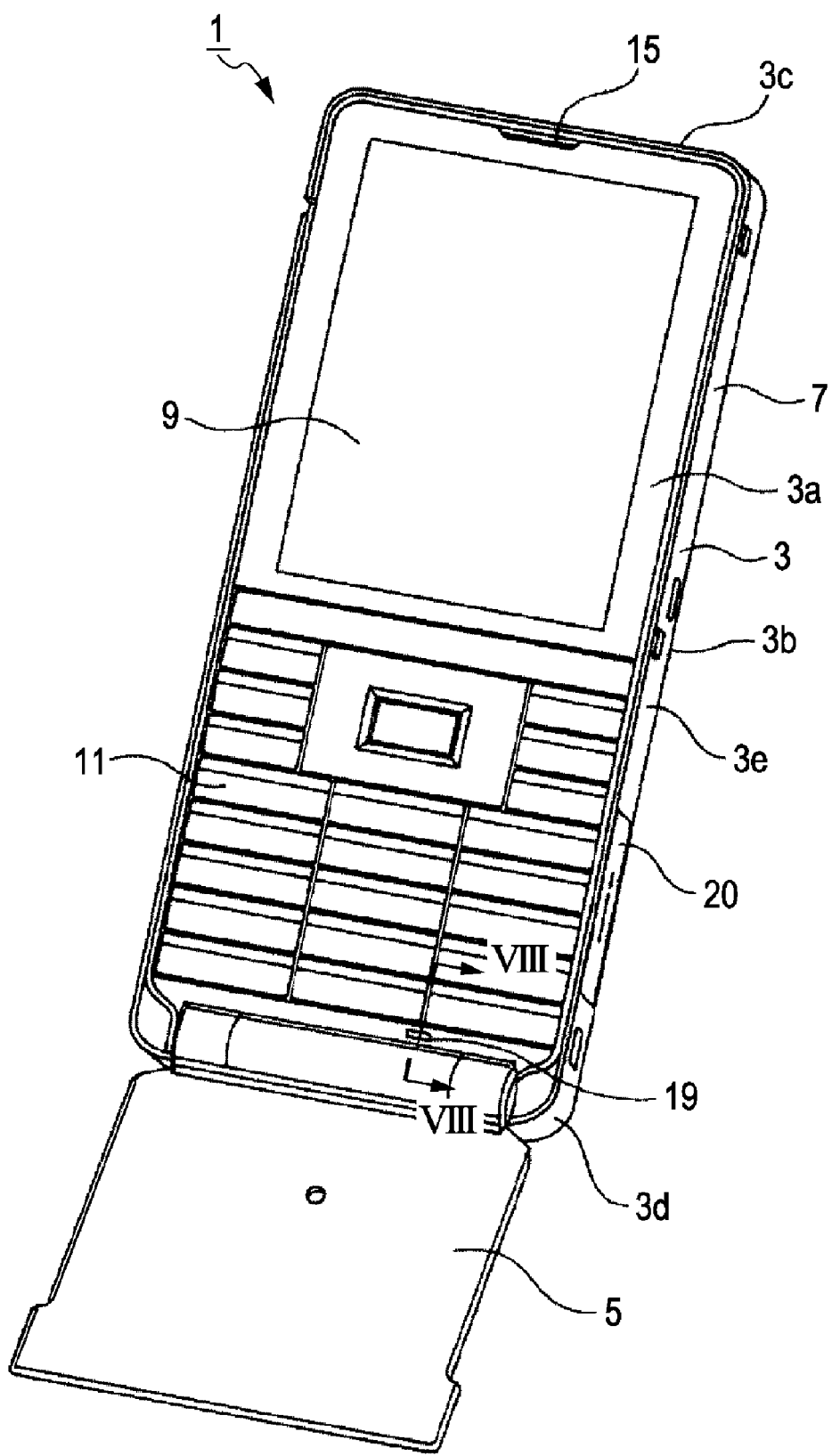
FIG. 1 is a schematic perspective view of a portable telephone according to an embodiment of the present invention.

A portable telephone 1 shown in FIG. 1 is a so-called flip-type portable telephone and has a main body 3 and a flippable portion 5 connected to the main body 3 in a foldable fashion.

The main body 3 includes a casing 7, a display portion 9 and an operating portion 11. The display portion 9 and the operating portion 11 are held by the casing 7. The display portion 9 and the operating portion 11 constitute a front face 3a of the main body 3. The front face 3a corresponds to a cover engaged with the casing 7. The display portion 9 is disposed proximate to a first end 3c of the main body 3, whereas the operating portion 11 is disposed proximate to a second end 3d of the main body 3. The front face 3a of the main body 3 has a sound releasing hole 15 of a telephonic speaker 13 (see FIG. 3; electroacoustic transducer) and a sound pickup hole 19 of a telephonic microphone 17 (see FIG. 8; electroacoustic transducer). The sound releasing hole 15 is disposed closer to the first end 3c than the display portion 9 is to the first end 3c. The sound pickup hole 19 is disposed closer to the second end 3d than the operating portion 11 is to the second end 3d. A side face 3e of the main body 3 is provided with an insertion hole 20 for a storage medium (not shown) and an insertion hole (not shown) for a connector.

Figure 2:
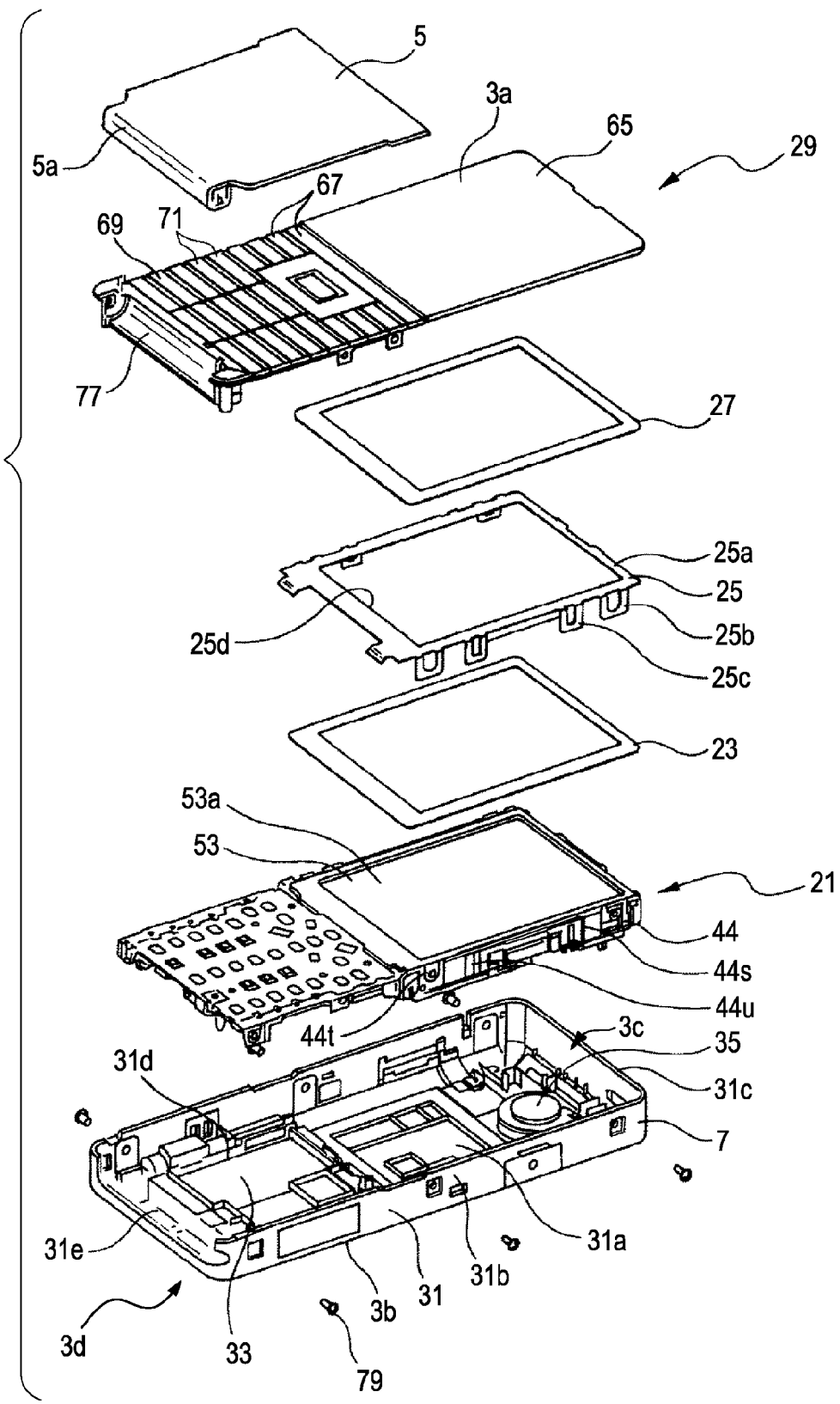
FIG. 2 is an exploded perspective view of the portable telephone shown in FIG. 1.

Referring to FIG. 2, the main body 3 of the portable telephone 1 includes the casing 7, an internal assembly unit 21 having various electric circuits, a packing 23, a frame component 25 for securing predetermined components, a double-sided tape 27, and a front-face-component group 29 that constitutes the front face 3a of the main body 3. The casing 7, the internal assembly unit 21, the packing 23, the frame component 25, the double-sided tape 27, and the front-face-component group 29 are stacked in that order from a rear face 3b of the main body 3.

In this embodiment, the casing 7 includes a rear casing member 31 and a lid member 33 that covers the rear face of the rear casing member 31. The lid member 33 may be united with the rear casing member 31. The rear casing member 31 and the lid member 33 may include an organic material such as resin. The rear casing member 31 has a base 31a and a peripheral wall 31b that projects toward the front face 3a from the periphery of the base 31a. The peripheral wall 31b extends along the periphery of the base 31a except for at the side at the second end 3d. The side of the rear casing member 31 opposite to the base 31a is provided with an opening 31c. In other words, the rear casing member 31 has the peripheral wall 31b that forms the opening 31c.

The base 31a of the rear casing member 31 has an aperture 31d into which a battery (not shown) can be inserted. The lid member 33 covers the rear face of the rear casing member 31 to close the aperture 31d, and is fixed to the rear casing member 31 with, for example, claw segments. The base 31a of the rear casing member 31 and the lid member 33 constitute the rear face 3b of the main body 3.

The casing 7 may have various planar shapes, such as a rectangular shape, square shape, or ellipsoidal shape. An informing speaker 35 is attached to the side of the first end 3c of the rear casing member 31 while a sound releasing face of the speaker 35 faces the base 31a. The base 31a of the rear casing member 31 has a sound releasing hole (not shown) for the speaker 35. The side of the second end 3d of the rear casing member 31 has a recess 31e to which a radio-communication internal antenna 89 (see FIG. 10) that uses radio waves is attached.

Figure 3:
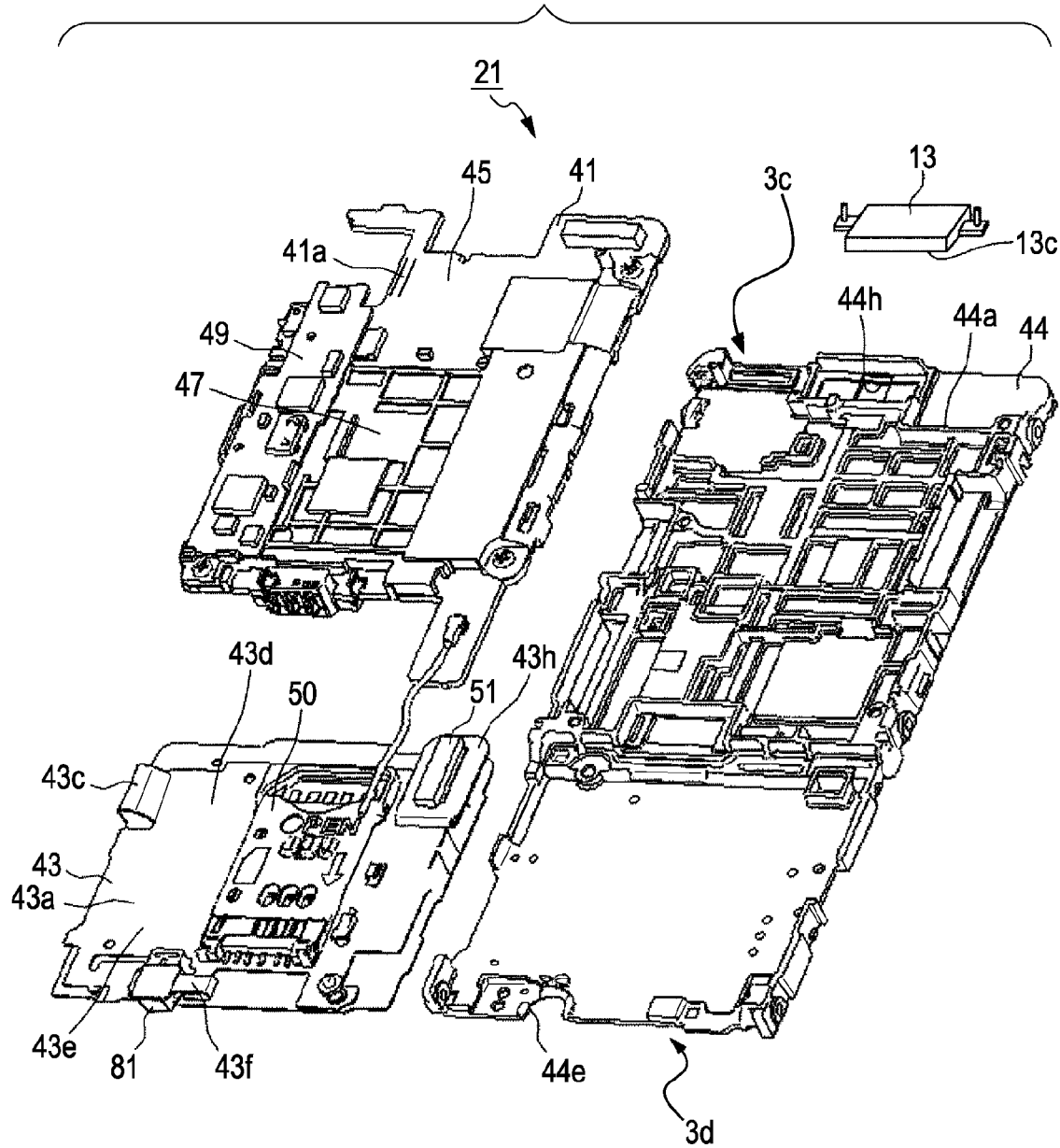
FIG. 3 is an exploded perspective view of a part of an internal assembly unit of the portable telephone in FIG. 1, as viewed from the rear side of a main body of the portable telephone.

Referring to FIG. 3, the internal assembly unit 21 includes a substrate assembly 41 disposed proximate to the first end 3c of the main body 3, a flexible printed circuit substrate (FPC) 43 disposed proximate to the second end 3d of the main body 3, and a frame 44 on which the substrate assembly 41 and the FPC 43 are disposed in a laminated fashion. Referring to FIG. 2, the internal assembly unit 21 is disposed such that the substrate assembly 41 and the FPC 43 face the rear casing member 31 and such that the frame 44 faces the packing 23.

The substrate assembly 41 is a laminate including, for example, a first circuit substrate 45, a shield member 47, and a second circuit substrate 49. The first circuit substrate 45 and the second circuit substrate 49 may include a resin-based printed circuit board. The first circuit substrate 45 and the second circuit substrate 49 have a ground pattern layer 41a serving as a ground line. The ground pattern layer 41a is electrically connected to the frame 44. The first circuit substrate 45 and the second circuit substrate 49 have various electronic components mounted thereon. Although the substrate assembly 41 includes the circuit substrates 45 and 49 in this embodiment, the substrate assembly 41 may alternatively include a single circuit substrate.

Figure 12:
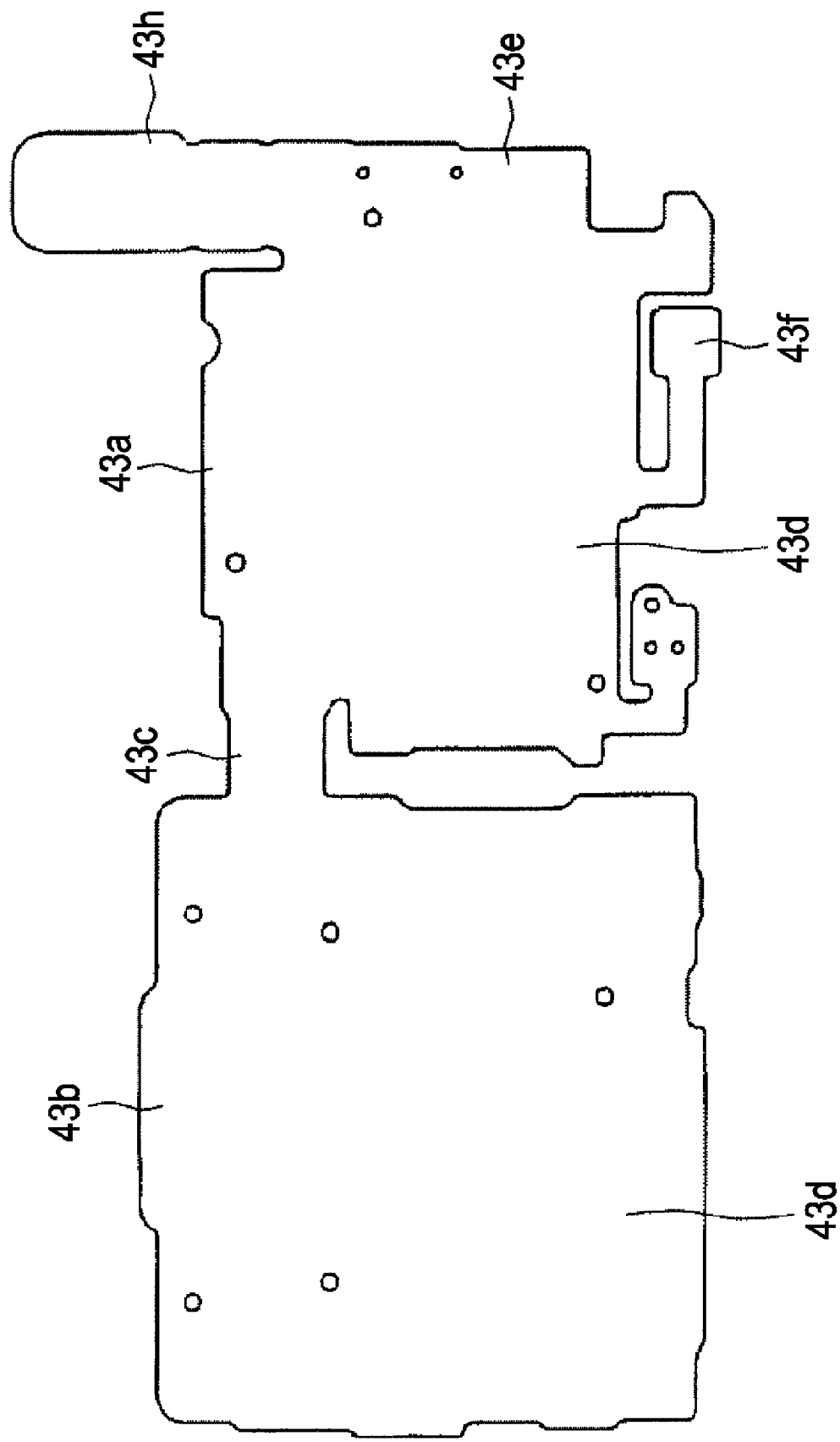
FIG. 12 is an unfolded view of an FPC of the portable telephone in FIG. 1.

The FPC 43 shown in FIG. 12 is a so-called single-sided mounting substrate and has electronic components mounted on one surface 43d thereof. The FPC 43 has a first mounting portion 43b serving as a first mounting substrate, a second mounting portion 43a serving as a second mounting substrate, and a connector segment 43c disposed between the second mounting portion 43a and the first mounting portion 43b. The FPC 43 is folded at the connector segment 43c and is disposed such that the first mounting portion 43b is located proximate to the frame 44 and the second mounting portion 43a is located proximate to the rear casing member 31 (see FIGS. 2 and 3).

The second mounting portion 43a of the FPC 43 is provided with, for example, the microphone 17 (see FIG. 8) and a connector 51 (see FIG. 3) that electrically connects the FPC 43 and the first circuit substrate 45. The connector 51 is attached to a tongue segment 43h (see also FIG. 12) of the second mounting portion 43a. The tongue segment 43h is appropriately bent so that the connector 51 is disposed at a position connectable to a connector (not shown) provided on the first circuit substrate 45. The components mounted on the first mounting portion 43b will be described in detail hereinafter.

The frame 44 may have various shapes, such as a substantially tabular shape. The frame 44 and the FPC 43 are fixed to each other by means of an adhesive material such as a double-sided tape or an adhesive.

The frame 44 has electrical conductivity in its surface or its entirety. For example, the frame 44 may comprise or consist of metal. The frame 44 is electrically connected to the ground pattern layer 41a of the substrate assembly 41 so as to function as a shield casing that shields the substrate assembly 41 and the FPC 43. For example, the surface of the frame 44 proximate to the substrate assembly 41 has a rib 44a that projects toward the substrate assembly 41 and extends in the same pattern as the ground pattern layer 41a on the mounting surface of the first circuit substrate 45 that faces the frame 44. The rib 44a contacts with the ground pattern layer 41a of the substrate assembly 41, whereby the frame 44 is electrically connected to the first circuit substrate 45.

Referring to FIG. 3, the speaker 13 is sandwiched between the first circuit substrate 45 and the frame 44 at the first end 3c side of the main body 3. The speaker 13 is disposed such that a sound releasing face 13c thereof faces the frame 44. The frame 44 has a hole 44h at a position facing the sound releasing face 13c of the speaker 13. The hole 44h is provided for guiding a sound output from the speaker 13 towards the front face 3a of the main body 3.

Referring to FIG. 4, in addition to the substrate assembly 41, the FPC 43, and the frame 44, the internal assembly unit 21 has a display unit 53 and a plurality of switches 55.

The display unit 53 may be a display capable of displaying images, such as a liquid crystal display or an organic electroluminescent (EL) display. The display unit 53 may have any kind of shape, such as a rectangular tabular shape, or square shape. The display unit 53 is fitted in a recess 44f provided on a surface of the frame 44 proximate to the front face 3a of the main body 3, so as to be fixed to the frame 44. The display unit 53 is electrically connected to the substrate assembly 41 via an FPC 59.

The switches 55 are provided on the first mounting portion 43b of the FPC 43. The switches 55 are pushable switches, such as dome-shaped switches. When each of the switches 55 is pushed, a predetermined signal is generated and output to the substrate assembly 41 via the FPC 43.

The switches 55 are coated with a relatively thin coating member 56, such as an insulating film.

In addition to the plurality of switches 55, the first mounting portion 43b has a plurality of light-emitting diodes (LEDs) 61 for illuminating the operating portion 11 and a plurality of resistors 63 for adjusting the electric current. The LEDs 61 and the resistors 63 are disposed between the switches 55.

The frame component 25 shown in FIG. 2 is attached to the display unit 53 and the frame 44 and has electrical conductivity. The frame component 25 is formed of, for example, a single sheet metal. The frame component 25 has, for example, a cover portion 25a that faces the display unit 53, and first fixation segments 25b and second fixation segments 25c that extend from the periphery of the cover portion 25a towards the rear face 3b of the main body 3.

The cover portion 25a has an opening 25d such that the cover portion 25a has a shape of a frame. The periphery and the opening 25d of the cover portion 25a may have any kind of shape, such as a rectangular shape, square shape, or ellipsoidal shape. The periphery and the opening 25d of the cover portion 25a have a size and shape that allow the cover portion 25a to cover the periphery of the display unit 53.

The first fixation segments 25b and the second fixation segments 25c are capable of clamping the frame 44 to contact with side faces 44s of the frame 44. The first fixation segments 25b have engagement holes engageable to screw bosses 44t (see also FIG. 4) projecting from the side faces 44s of the frame 44. The second fixation segments 25c have engagement holes engageable to engagement sections 44u (see also FIG. 4) projecting from the side faces 44s of the frame 44.

By disposing the frame component 25 over the display unit 53 and the frame 44 and engaging the first fixation segments 25b and the second fixation segments 25c to the screw bosses 44t and the engagement sections 44u of the frame 44, the display unit 53 can be prevented from becoming detached from the recess 44f.

The packing 23 shown in FIG. 2 may comprise an elastic member such as a sponge or rubber material. The packing 23 is disposed on the surface of the cover portion 25a of the frame component 25 that faces the display unit 53, and has a size and shape that can come into contact with the entire periphery of the cover portion 25a. The packing 23 is interposed between the cover portion 25a of the frame component 25 and the display unit 53 and/or the frame 44, and is in contact with these components. The packing 23 is fixed to the frame component 25 by means of, for example, an adhesive material such as an adhesive or a double-sided tape.

The front-face-component group 29 includes a light transmissive plate 65 for protecting the display unit 53, a cover member 67 for hiding predetermined gaps and components, and an operating unit 69 for receiving operation commands from a user. The light transmissive plate 65, the cover member 67, and the operating unit 69 may be fixed to one another, or do not have to be fixed to one another.

The light transmissive plate 65 has a size and shape fittable to the opening 31c of the rear casing member 31 at the first end 3c side. The light transmissive plate 65 is fixed to the frame component 25 by means of the double-sided tape 27. The double-sided tape 27 may have a size and shape that allow the light transmissive plate 65 to be fixed to the entire periphery of the frame component 25. In place of a double-sided tape, the light transmissive plate 65 may be fixed to the frame component 25 by means of another adhesive material such as an adhesive.

The cover member 67 may comprises resin. The cover member 67 is disposed between the light transmissive plate 65 and key tops 71, which will be described hereinafter, of the operating unit 69. The cover member 67 may be fixed on the frame component 25 and a skeletal member 73, which will be described hereinafter, by means of a double-sided tape or an adhesive.

The operating unit 69 shown in FIG. 5 includes a key sheet 75 disposed over the plurality of switches 55, the skeletal member 73 disposed over the key sheet 75, and the plurality of key tops 71 disposed over the skeletal member 73.

The key sheet 75 may comprise silicon rubber having light transmissive properties. The key sheet 75 may have dimensions that cover the first mounting portion 43b of the FPC 43. The key sheet 75 has a plurality of base sections 75a that project towards the front face 3a at positions coinciding with the plurality of switches 55. From the rear face of each base section 75a projects a pushing segment 71b (see FIG. 8) at a position facing the corresponding switch 55.

The skeletal member 73 may comprise a single sheet metal. The skeletal member 73 includes a cover portion 73a that covers the key sheet 75, and third fixation segments 73b and fourth fixation segments 73c that project from edges of the cover portion 73a towards the key sheet 75. The cover portion 73a has a plurality of holes 73h to which the plurality of base sections 75a can be fitted.

Similar to the first fixation segments 25b and the second fixation segments 25c of the frame component 25, the third fixation segments 73b and the fourth fixation segments 73c of the skeletal member 73 are capable of clamping the frame 44 to contact with the side faces 44s of the frame 44. Like the first fixation segments 25b, the third fixation segments 73b have engagement holes engageable to the screw bosses 44t. On the other hand, like the second fixation segments 25c, the fourth fixation segments 73c have engagement holes engageable to the engagement sections 44u.

The key tops 71 may comprise an organic material such as resin. The key tops 71 are made larger in size than the holes 73h of the skeletal member 73. The key tops 71 are fixed to the base sections 75a of the key sheet 75 through the holes 73h. The key tops 71 are fixed to the base sections 75a by means of, for example, an appropriate adhesive material such as an adhesive.

Because the key sheet 75 has elasticity, the base sections 75a are tiltable in the pushing direction of the switches 55 with respect to the skeletal member 73.

The key tops 71 are adjacent to one another and have no components disposed therebetween. Referring to FIG. 1, the key tops 71 located near the outer periphery are adjacent to the peripheral wall 31b of the rear casing member 31. In other words, at the front side of the key tops 71, the key tops 71 located near the outer periphery and the peripheral wall 31b of the rear casing member 31 have no components disposed therebetween.

Referring to FIG. 2, the flippable portion 5 has a joint section 5a that is joined to a joint member 77 of the main body 3, whereby the flippable portion 5 is connected to the main body 3 in a foldable fashion. The joint member 77 and the joint section 5a also constitute the front face 3a of the main body 3.

An assembly method of the portable telephone 1 having the above-described configuration will now be described.

First, the display unit 53, the frame 44, the frame component 25, and the light transmissive plate 65 are joined together. Specifically, the display unit 53 is fixed to the recess 44f in the frame 44. The frame component 25 is disposed over the display unit 53 and the frame 44, and is fixed to the frame 44 by means of the first fixation segments 25b and the second fixation segments 25c. The light transmissive plate 65 is fixed to the frame component 25 by means of the double-sided tape 27. The step of fixing the frame component 25 to the frame 44 and the step of fixing the light transmissive plate 65 to the frame component 25 can be performed in random order.

Next, the FPC 43 having the switches 55, and the operating unit 69 are fixed to the frame 44. The operating unit 69 comprises a laminate of the key sheet 75, the skeletal member 73, and the key tops 71. The FPC 43 may be fixed to the frame 44 by a double-sided tape. The operating unit 69 is disposed over the switches 55 above the frame 44, and is fixed to the frame 44 by means of the third fixation segments 73b and the fourth fixation segments 73c.

The substrate assembly 41 is attached to the surface of the frame 44 having the rib 44a. Specifically, the substrate assembly 41 is fixed to the surface of the frame 44 having the rib 44a by stacking the first circuit substrate 45, the shield member 47, and the second circuit substrate 49 in that order. In this case, when the first circuit substrate 45 is being stacked on the frame 44, the speaker 13 is securely interposed between the frame 44 and the first circuit substrate 45.

Subsequently, the frame component 25, the operating unit 69, and the frame 44 are fitted into the rear casing member 31. In this case, the substrate assembly 41 is held between the frame 44 and the rear casing member 31. The side faces 44s of the frame 44 contacts with the inner surface of the peripheral wall 31b of the rear casing member 31. In other words, the frame 44 becomes fitted in the rear casing member 31. In addition, the first fixation segments 25b, the second fixation segments 25c of the frame component 25, the third fixation segments 73b, and the fourth fixation segments 73c of the skeletal member 73 become inserted between the side faces 44s of the frame 44 and the inner surface of the peripheral wall 31b.

Referring to FIG. 2, a plurality of screws 79 are inserted into the peripheral wall 31b of the rear casing member 31. Specifically, the screws 79 are inserted in a direction that is perpendicular to the wall 31b. The inserted screws 79 penetrate the holes in the first fixation segments 25b or the third fixation segments 73b. The inserted screws 79 are then screwed onto the screw bosses 44t provided on the side faces 44s of the frame 44. With this screwing of the screws 79, the first fixation segments 25b and the third fixation segments 73b are fastened together to the frame 44 so as to contact with the frame 44, whereby the first fixation segments 25b and the third fixation segments 73b become electrically connected to the ground pattern layer 41a of the substrate assembly 41 via the frame 44. The screws 79 may comprise metal.

After the frame 44 is attached to the rear casing member 31 in this manner, the joint member 77 is fitted into the rear casing member 31. In this case, the joint member 77 contacts with the inner surface of the peripheral wall 31b so as to become fitted in the rear casing member 31.

The display portion 9 comprises the display unit 53, the frame component 25, and the light transmissive plate 65. The operating portion 11 comprises the switches 55 and the operating unit 69.

In addition to the above-described configuration, the portable telephone 1 according to this embodiment has the following configuration for disposing the microphone 17 (see FIG. 8) at an appropriate position.

Referring to FIGS. 3 and 4, the portable telephone 1 has a holder 81 for holding the microphone 17. The microphone 17 and the holder 81 are disposed in the internal assembly unit 21 at a position near the second end 3d of the main body 3 of the portable telephone 1.

Figure 6A:
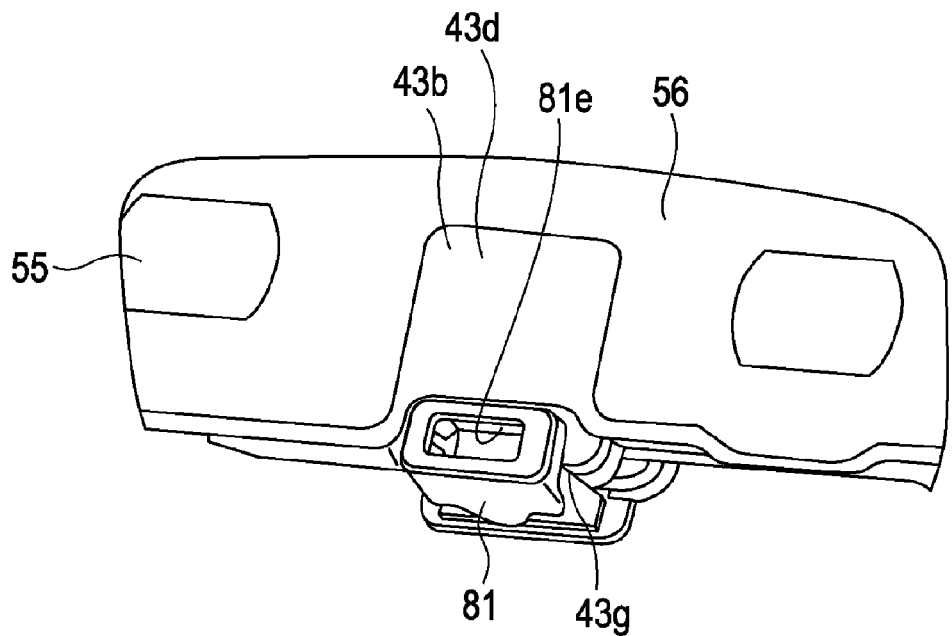
FIG. 6A is an enlarged perspective view showing a peripheral area of a microphone of the portable telephone in FIG. 1, as viewed from the front side of the portable telephone.
Figure 6B:
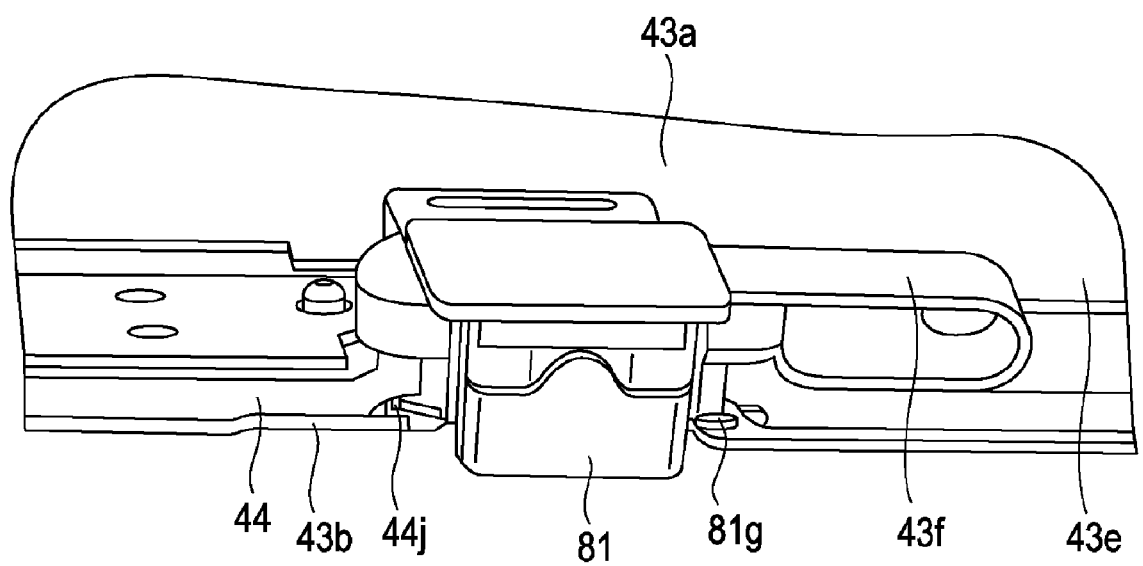
FIG. 6B is an enlarged perspective view showing a peripheral area of the microphone of the portable telephone in FIG. 1, as viewed from the rear side of the portable telephone.

Referring to FIGS. 3, 6B, and 12, the FPC 43 further has a main portion 43e and an attachment portion 43f. The attachment portion 43f is formed at the edge of the main portion 43e so as to project outward from the main portion. The attachment portion 43f is bent relative to the main portion 43e and is disposed so as to face the frame 44.

Referring to FIGS. 3 and 12, the main portion 43e has, for example, a slot 50 into which a memory card (not shown) can be inserted, and a feeder terminal (not shown) for connecting the antenna 89 and the FPC 43.

The attachment portion 43f may have a long rectangular shape and is bent at an intermediate section thereof as shown in FIG. 3.

Although the microphone 17 is hidden behind the holder 81 and is thus not shown in FIGS. 3, 4, 6A, and 6B, the microphone 17 is provided on the attachment portion 43f such that a sound pickup face 17a (see FIG. 8) of the microphone 17 is oriented towards the front face 3a.

The holder 81 covers the sound pickup face 17a of the microphone 17. The holder 81 has a sound hole 81e (see FIGS. 4 and 6A) at the front face 3a side thereof. The holder 81 may comprise an elastic material such as rubber or styrofoam.

Figure 7A:
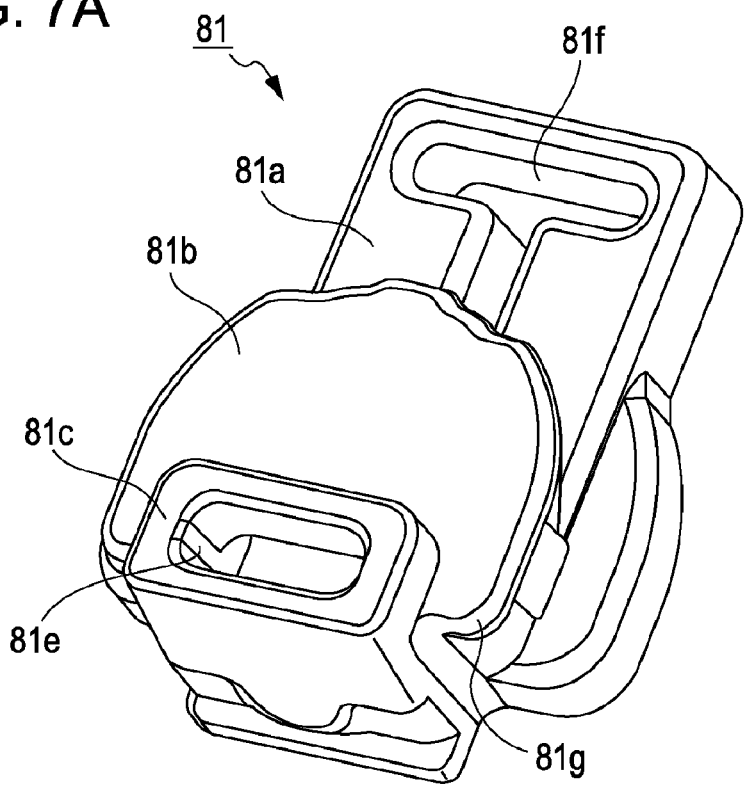
FIG. 7A is a perspective view of a holder that holds the microphone of the portable telephone in FIG. 1, as viewed from the front side of the portable telephone.
Figure 7B:
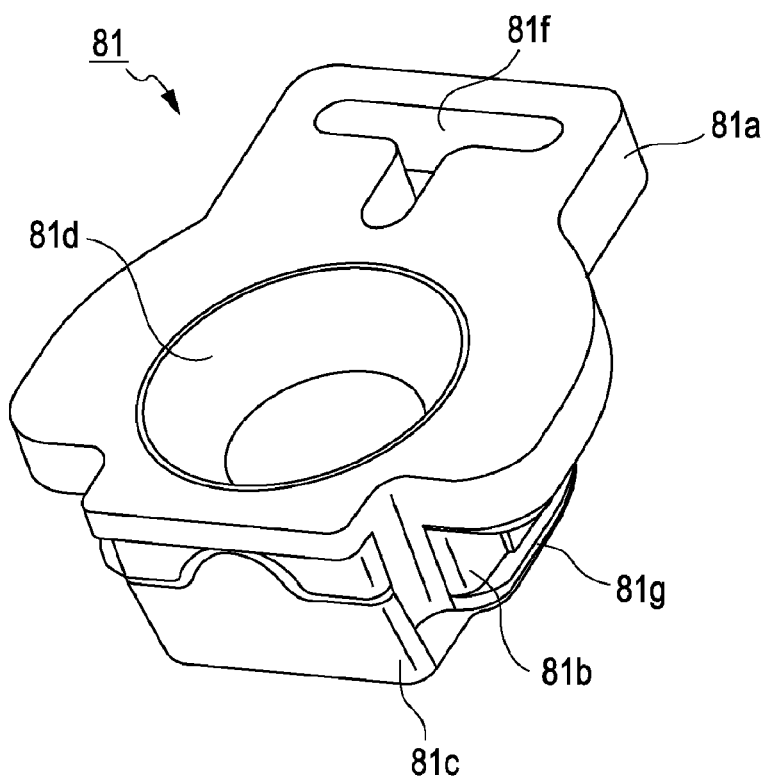
FIG. 7B is a perspective view of the holder that holds the microphone of the portable telephone in FIG. 1, as viewed from the rear side of the portable telephone.

Referring to FIGS. 7A and 7B, the holder 81 includes a first component 81a, a second component 81b disposed on the first component 81a, and a third component 81c disposed on the second component 81b and having an area smaller than that of the second component 81b. The first component 81a, the second component 81b, and the third component 81c form two steps at the front face 3a side of the holder 81. The first component 81a, the second component 81b, and the third component 81c each have a flat surface at the front face 3a side thereof. Likewise, the holder 81 has a flat surface at the rear face 3b side thereof.

The holder 81 has a depression 81d in which the microphone 17 can be fitted. The depression 81d has a size and shape that allow the microphone 17 to be fitted therein. Consequently, the microphone 17 is press-fitted into the depression 81d so as to be fixed to the holder 81. The depression 81d and the microphone 17 may be given an appropriate shape, such as a cylindrical shape or a disc shape.

Referring to FIG. 7A, the sound hole 81e is provided at the front face 3a side of the third component 81c. Furthermore, the sound hole 81e communicates with the depression 81d provided at the second end 3d side of the holder 81.

The first component 81a has an engagement hole 81f used for fixing the holder 81 to the frame 44. The engagement hole 81f may be given an appropriate shape, such as a T shape.

The second component 81b has an engagement projection 81g used for fixing the holder 81 to the frame 44. The engagement projection 81g extends along the edge of the second component 81b and projects outward from the front face of the second component 81b. In other words, the side face of the second component 81b can be considered as having an engagement groove formed by the engagement projection 81g and the first component 81a.

Figure 8:
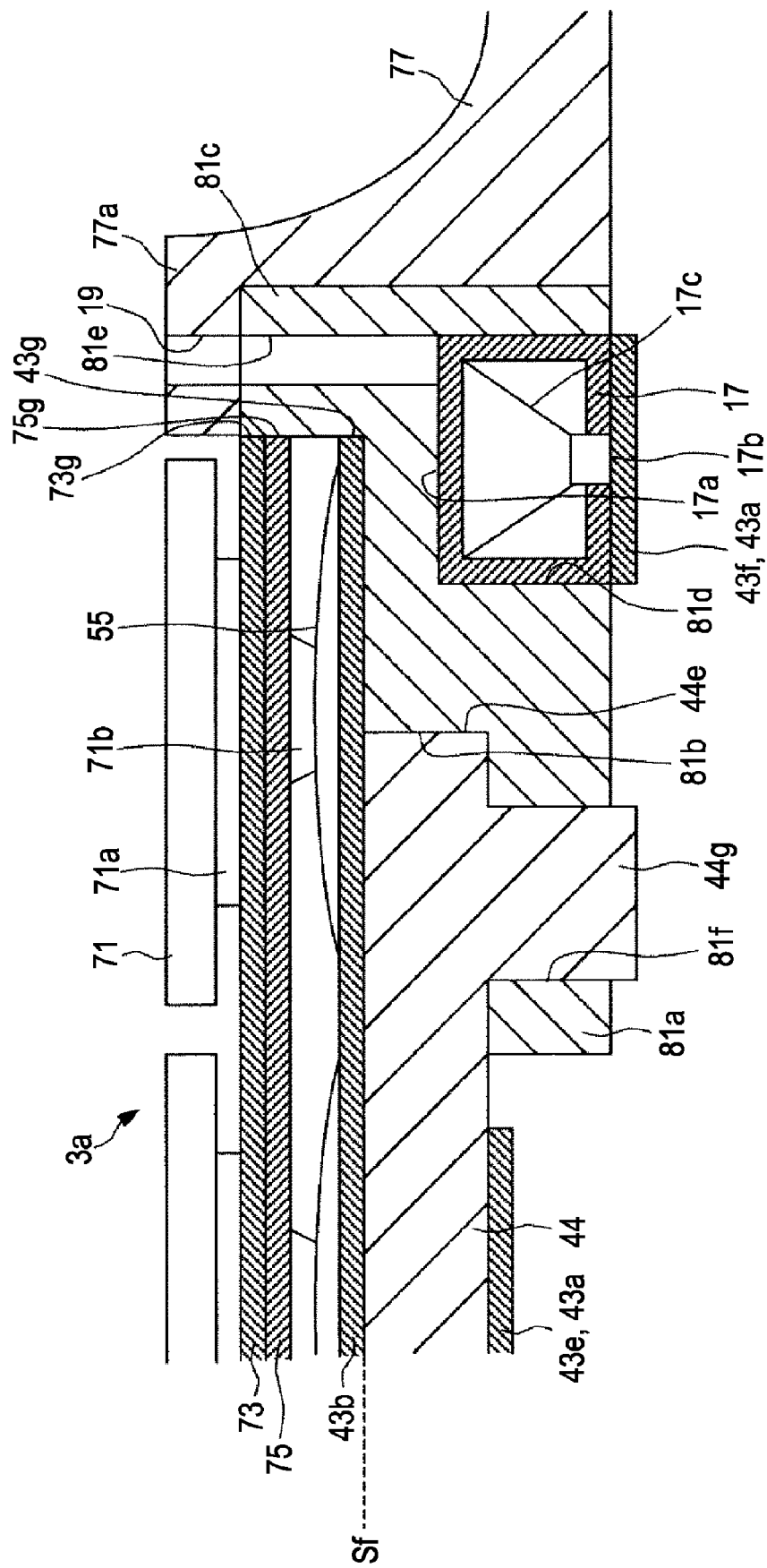
FIG. 8 is a cross-sectional view taken along line VIII-VIII in FIG. 1.

The microphone 17 shown in FIG. 8 has a housing which may be cylindrical shape. The housing has the sound pickup face 17a on one end thereof and a terminal 17b on the other end thereof. The microphone 17 converts a sound received from the sound pickup face 17a into an electric signal and outputs the electric signal to the terminal 17b. The microphone 17 may be a dynamic microphone that includes a diaphragm 17c provided within the housing, a permanent magnet (not shown) connected to the diaphragm 17c, and a coil (not shown) that is movable with respect to the permanent magnet. Alternatively, the microphone 17 may be a capacitor microphone or a ribbon microphone.

The microphone 17 is mounted on the attachment portion 43f of the second mounting portion 43a such that the terminal 17b faces the attachment portion 43f. The microphone 17 and the second mounting portion 43a are fixed to each other by the conductive material. As a conductive material, solder may be used. The microphone 17 is press-fitted to the depression 81d of the holder 81 from the sound pickup face 17a side. The depression 81d may have a depth that is substantially equivalent to the thickness of the microphone 17 between the sound pickup face 17a and the terminal 17b.

The depth of the depression 81d is smaller than the total thickness of the first component 81a and the second component 81b. The cross-sectional area of the sound hole 81e is smaller than the area of the sound pickup face 17a. Consequently, the second component 81b partially covers the sound pickup face 17a. The third component 81c projects continuously from the second component 81b and has the sound hole 81e therein, so as to function as a tubular section that extends in a tubular shape.

The frame 44 shown in FIG. 8 has a cutout 44e (see also FIGS. 3 and 4) at the side of the second end 3d. The cutout 44e is engageable to the second component 81b of the holder 81. As mentioned above, the attachment portion 43f is bent relative to the main portion 43e, and the second component 81b of the holder 81 is press-fitted to the cutout 44e.

In this case, the first component 81a contacts the frame 44.

When the second component 81b is fitted into the cutout 44e, the inner periphery of the cutout 44e becomes held between the engagement projection 81g shown in FIG. 6B and the first component 81a. In detail, the engagement projection 81g contacts the first mounting portion 43b of the frame 44, and the first component 81a contacts the second mounting portion 43a of the frame 44, so that the second component 81b becomes engaged to the frame 44.

Furthermore, the second mounting portion 43a of the frame 44 has an engagement protrusion 44g corresponding to an example of an engaging portion, having a shape that is engageable to the engagement hole 81f corresponding to an example of an engaged portion (i.e., a T shape in this embodiment). The engagement protrusion 44g is thus press-fitted to the engagement hole 81f.

In this manner, the holder 81 is fixed to the frame 44. The microphone 17 is fixed to the frame 44 such that the sound pickup face 17a is oriented towards the front face 3a. The cutout 44e is an example of an engaged portion and the second component 81b is an example of an engaging portion.

The thickness of the second component 81b is the same as the thickness of a section of the frame 44 on which the FPC 43 is mounted. Consequently, as shown with a dotted line Sf in FIG. 8, the first mounting portion 43b of the frame 44 is flush with the second component 81b. Moreover, the first mounting portion 43b is in contact with the second component 81b. In other words, the region of the cutout 44e in the frame 44 is filled with the second component 81b, and the first mounting portion 43b is partially disposed above this region. A region of the first mounting portion 43b that corresponds to the cutout 44e is provided with one of the resistors 63 as shown in FIG. 4. In addition to a resistor 63, one of the LEDs 61, for example, may also be provided.

The first mounting portion 43b has a cutout 43g (see also FIG. 6A) on an edge thereof proximate to the second end 3d. The key sheet 75 has a cutout 75g (see also FIG. 5) on an edge thereof proximate to the second end 3d. The cutout 75g is provided in a region of the edge that corresponds to the cutout 43g. Likewise, the skeletal member 73 has a cutout 73g (see also FIG. 5) on an edge thereof proximate to the second end 3d. The cutout 73g is provided in a region of the edge that corresponds to the cutout 43g. In other words, the cutout 43g, the cutout 75g, and the cutout 73g form a continuous opening.

The holder 81 is fixed to the frame 44 in a state such that the third component 81c is partially fitted in the cutout 43g, the cutout 75g, and the cutout 73g.

The joint member 77 is positioned adjacent to the second end 3d side of the holder 81. The joint member 77 has an end-cover portion 77a located near the key tops 71, which constitutes a part of the front face 3a of the portable telephone 1. The end-cover portion 77a covers the third component 81c of the holder 81. The end-cover portion 77a has the sound pickup hole 19. The sound pickup hole 19 is in communication with the sound hole 81e of the holder 81. Thus, a sound received from the sound pickup hole 19 is input to the sound pickup face 17a of the microphone 17 via the sound hole 81e. The sound pickup hole 19 and the sound hole 81e constitute a sound path for the microphone 17.

Figure 9A:
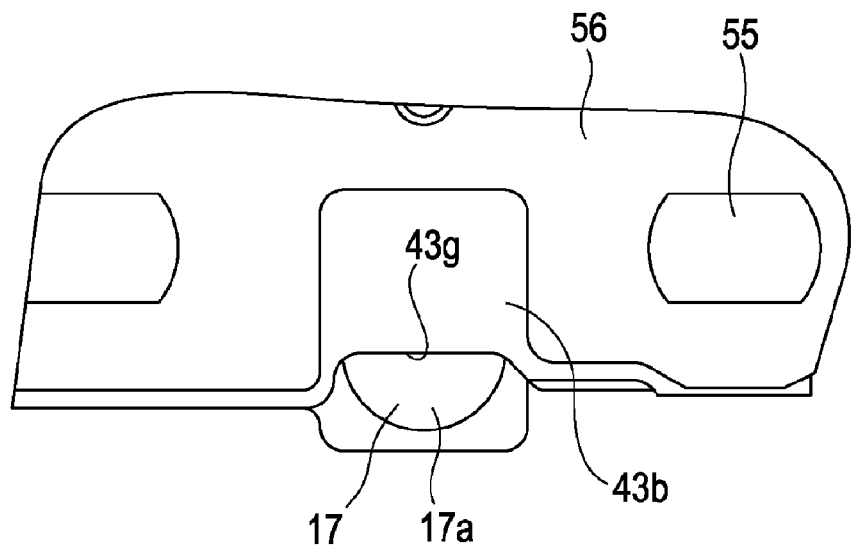
FIG. 9A is a plan view showing the positional relationship among the microphone, a first mounting portion, and a second mounting portion in the portable telephone in FIG. 1, as viewed from the first mounting portion side.
Figure 9B:
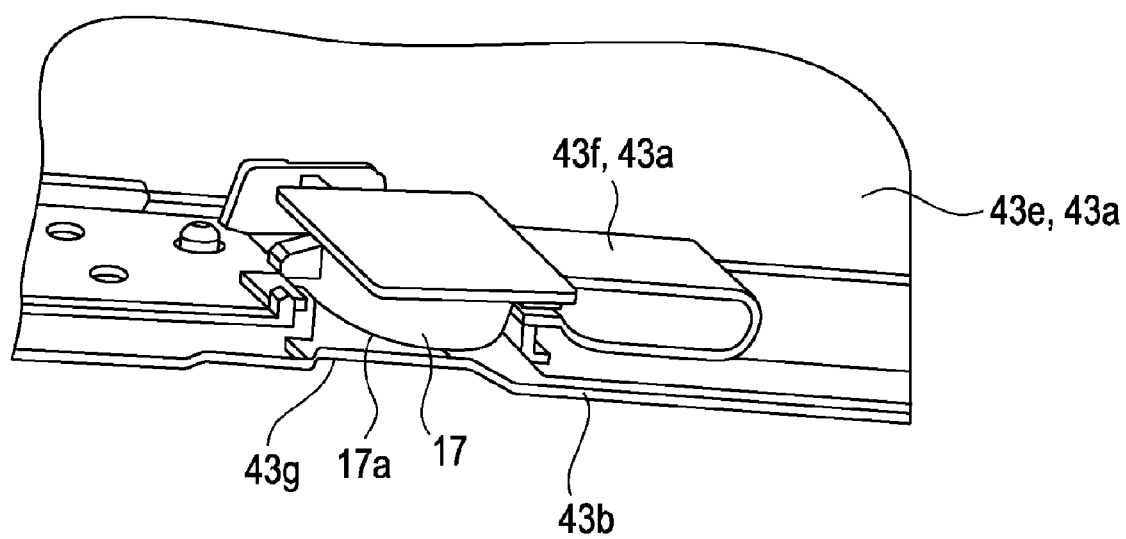
FIG. 9B is a perspective view showing the positional relationship among the microphone, the first mounting portion, and the second mounting portion in the portable telephone in FIG. 1, as viewed from the second mounting portion side.

The positional relationship between the microphone 17 and the FPC 43 will be described with reference to FIGS. 9A and 9B in which the holder 81 is omitted. As shown in FIGS. 9A and 9B, a part of the microphone 17 overlaps the first mounting portion 43b of the FPC 43, and another part of the microphone 17 is exposed from an edge of the first mounting portion 43b through the cutout 43g of the first mounting portion 43b. For example, about half of the microphone 17 may overlap the first mounting portion 43b.

Figure 10:
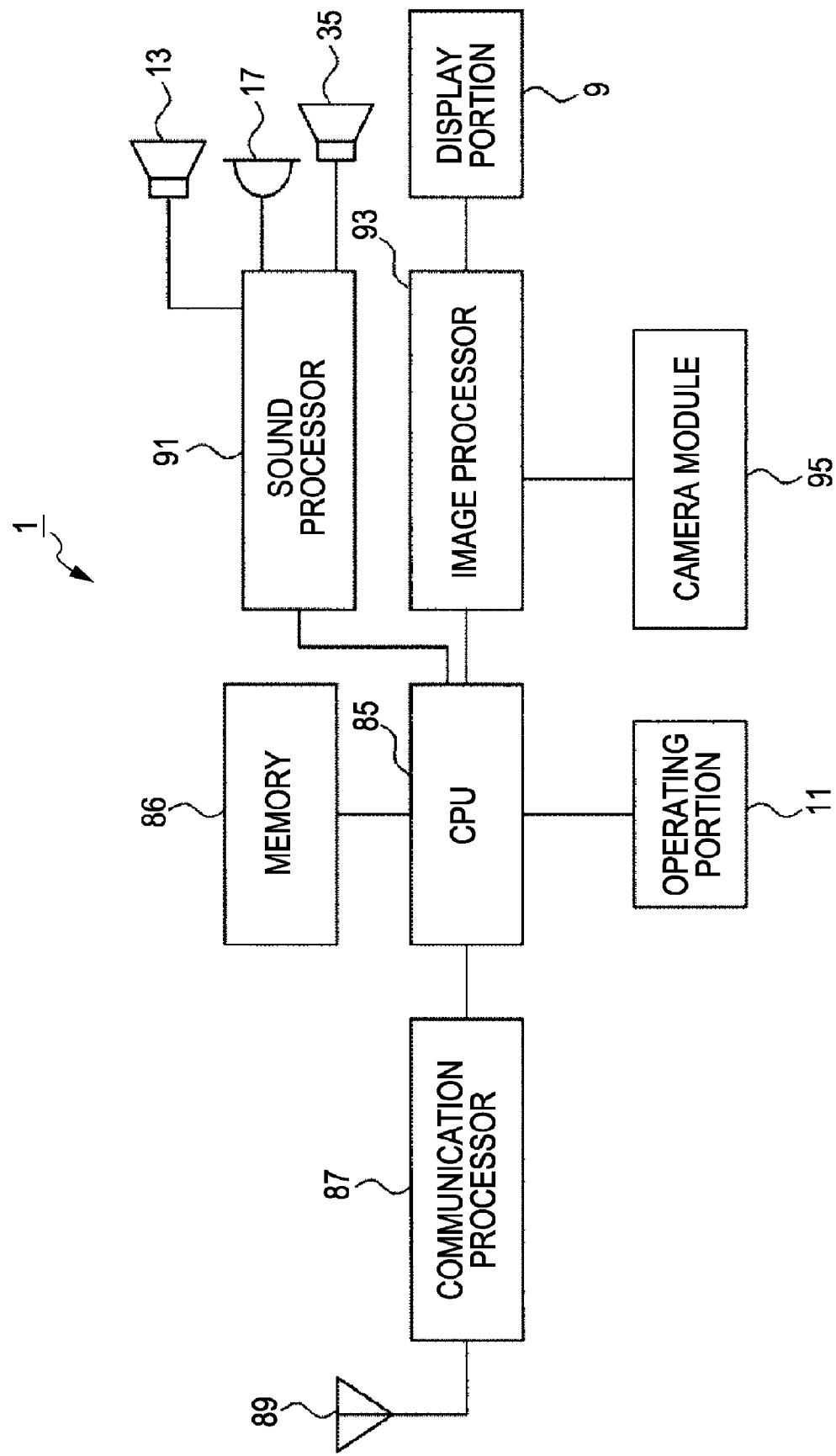
FIG. 10 is a block diagram of a signal processing system of the portable telephone in FIG. 1.

Referring to FIG. 10, the portable telephone 1 includes a central processing unit (CPU) 85, a memory 86, a communication processor 87, a sound processor 91, and an image processor 93. These elements are included in an integrated circuit (IC) provided in the substrate assembly 41.

The CPU 85 and the memory 86 perform predetermined calculations on the basis of signals received from various elements such as the operating portion 11, and function as a control unit that controls various elements such as the image processor 93.

The communication processor 87 includes a high-frequency circuit. In order to perform long-range radio communication using radio waves, the communication processor 87 modulates various data processed by the CPU 85, such as sound data and image data, and outputs the modulated data through the antenna 89. Furthermore, the communication processor 87 demodulates signals received through the antenna 89, and outputs the demodulated signals to the CPU 85.

The sound processor 91 converts sound data from the CPU 85 into an electric signal, and outputs the electric signal to the telephonic speaker 13 and/or to the speaker 35 for informing the user of an incoming call. The speaker 13 and the speaker 35 convert the electric signal from the sound processor 91 into sound, and then output the sound. On the other hand, the microphone 17 converts input sound into an electric signal, and outputs the electric signal to the sound processor 91. The sound processor 91 converts the electric signal from the microphone 17 into sound data, and outputs the sound data to the CPU 85.

The image processor 93 converts image data received from the CPU 85 into an image signal, and outputs the image signal to the display portion 9. The image processor 93 also converts an image pickup signal (image data) output from a predetermined camera module 95 into image data of a predetermined format, and outputs the image data to the CPU 85.

According to the above embodiment, the microphone 17 can be disposed between the FPC 43 and the rear casing member 31, thereby allowing for compactness of the casing. In addition, by basically utilizing the flexibility of the FPC 43, the microphone 17 having the sound pickup face 17a on one end and the terminal 17b on the other end can be connected to the FPC 43 while having the sound pickup face 17a oriented towards the front face 3a. This effectively prevents an increase in the number of components, such as additional lead wires for connecting a microphone and a substrate.

Since the FPC 43 is reinforced by the frame 44 in this embodiment, a sufficient strength can be obtained even with the use of the FPC 43.

The holder 81 holding the microphone 17 has the sound hole 81e and is fixed to the frame 44. Therefore, the holder 81 has a dual function for both securing the microphone 17 and forming a sound path for the microphone 17. The sound hole 81e has a cross-sectional area that is smaller than the area of the sound pickup face 17a of the microphone 17. Furthermore, the microphone 17 is disposed such that a part thereof overlaps the first mounting portion 43b of the FPC 43 in plan view. Consequently, in contrast to a case where the microphone 17 and the first mounting portion 43b are arranged in parallel to each other such that they do not overlap each other in plan view, the area of the microphone 17 can be reduced while still achieving the sound pickup capability by the microphone 17. Accordingly, this contributes to a reduced number of components and compactness of the casing.

The holder 81 is an elastic member, and the microphone 17 is press-fitted to a hole formed in the holder 81 so as to be fixed to the holder 81. Thus, the microphone 17 can be readily fixed to the frame 44 without causing an increase in the number of components such as screws. In addition, since the microphone 17 is press-fitted in the elastic member, the sound pickup face 17a of the microphone 17 is sealed by the holder 81, thereby achieving a tighter seal for the sound path and an efficient sound pickup capability. Moreover, with the use of an elastic member as the holder 81, the vibration of the microphone 17 can be absorbed by the holder 81, thereby reducing the transmission of the undesired vibration to, for example, the frame 44.

Even though a part of the holder 81 is fixed to the cutout 44e of the frame 44, since this part of the holder 81 within the cutout 44e is flush with the frame 44, the first mounting portion 43b can be disposed in a region corresponding to the cutout 44e without interfering with the holder 81. Accordingly, the FPC 43 and the microphone 17 can be made to overlap each other in plan view without trouble while achieving tight fixation of the holder 81. As a result, the space inside the casing can be utilized efficiently, thereby achieving compactness of the casing.

In this embodiment, the key sheet 75 is provided, which is disposed over the plurality of switches 55 and has the cutout 75g that is opposed to the cutout 44e of the frame 44. Moreover, the third component 81c extends to the cutout 75g of the key sheet 75. Thus, the sound hole 81e that extends from the microphone 17 to the key sheet 75 is obtained by means of the holder 81. Accordingly, a tight seal is attained over a long range of the sound path, whereby a good sound pickup capability can be achieved even with a sound path having a small cross-sectional area.

The present invention is not limited to the above-described embodiment, and various alternative embodiments are permissible.

A portable electronic device to which the present invention is applied is not limited to a portable telephone. For example, the electronic device may alternatively be a notebook computer, a personal digital assistant (PDA), a digital camera, or a game device.

The electroacoustic transducer may be a type that performs at least one of the conversion from an electric signal to sound and the conversion from sound to an electric signal. Accordingly, the electroacoustic transducer is not limited to a microphone. For example, the electroacoustic transducer may alternatively be a speaker.

An acoustic portion of the electroacoustic transducer may be a portion where sound output or sound input is performed. Therefore, the acoustic portion is not limited to a sound pickup face (sound pickup portion) of a microphone where a sound is received. For example, the acoustic portion may be a sound releasing face (sound releasing portion) of a speaker where a sound is output. The area of the acoustic portion can be determined from, for example, an area of an opening that faces the diaphragm in the housing of the electroacoustic transducer.

The first mounting substrate having the first mounting surface provided with the plurality of switches or the second mounting substrate is not limited to a flexible substrate. For example, a rigid-resin-based circuit substrate may be used as an alternative.

In the above-described embodiment, the frame may be omitted. For example, if one of or each of the first mounting substrate and the second mounting substrate is a rigid-resin-based circuit substrate as mentioned above, the frame can be omitted. In that case, the second mounting substrate may be stacked directly on the rear face of the first mounting substrate.

The fixation method of the electroacoustic transducer is not limited to the method using a holder, the method using an engagement section of a holder, or the method of press-fitting the electroacoustic transducer into a holder composed of an elastic material. For example, the electroacoustic transducer may be fixed by means of an appropriate fixation member, such as a screw, an adhesive, or double-sided tape.

Figure 11:
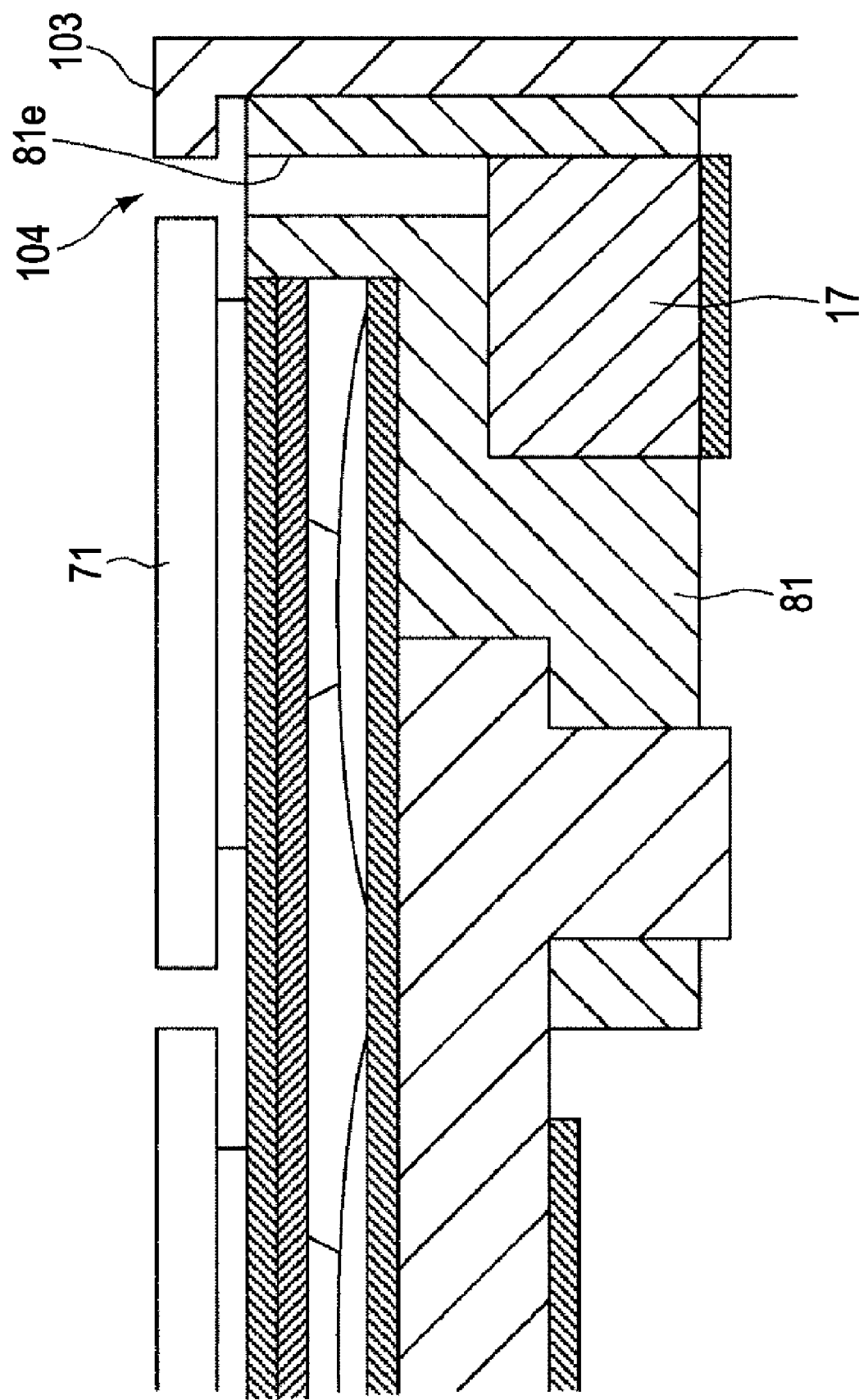
FIG. 11 is a cross-sectional view showing a modified example of a sound releasing hole.

FIG. 11 is a cross-sectional view corresponding to FIG. 8 in the above embodiment and shows a modified example of the sound releasing hole.

In this modified example, a gap 104 between the key tops 71 and a casing 103 serves as a section of the sound path of the microphone 17 that communicates with the exterior of the casing 103. With this configuration, the distance between the key tops 71 and the outer edge of the casing 103 can be further reduced, thereby allowing for compactness of the casing 103.

It is needless to say that the present invention is not limited to the foregoing embodiments. It is therefore understood that numerous modifications and variations can be devised by those skilled in the art without departing from the scope of the appended claims. Accordingly, such modifications and variations are, unless they depart from the scope of the present invention as delivered from the claims appended hereto, to be construed as included therein.

The invention claimed is:

1. A portable electronic device comprising:
   a cover;
   a casing engaged with the cover to form a space therebetween;
   a first mounting substrate in the space;
   a second mounting substrate between the first mounting substrate and the casing and electrically connected to the first mounting substrate; and
   an electroacoustic transducer for converting from one of an audio and an electric signal into the other;
   wherein the second mounting substrate has a flexibility, and comprises a mounting surface on which a component is mounted and an attachment portion which is bent relative to the mounting surface;
   wherein the electroacoustic transducer is placed on the attachment portion.

2. A portable electronic device according to claim 1, further comprising: a switch mounted on the first mounting substrate, wherein the cover comprises an operating unit including the switch.

3. A portable electronic device according to claim 1, wherein the mounting surface facing the casing.

4. A portable electronic device according to claim 3, further comprising:
a frame between the first and the second mounting substrates.

5. A portable electronic device according to claim 4, wherein the first mounting substrate is flexible and the first and the second mounting substrates are united with each other.

6. A portable electronic device according to claim 4, wherein the cover further comprises a display for displaying an image based on the input from the operation unit.

7. A portable electronic device according to claim 4, further comprising:
a holder for holding the electroacoustic transducer, the holder fixed with the frame.

8. A portable electronic device according to claim 7, wherein the holder is elastic, wherein one of the holder and the frame has an engaging portion and the other has an engaged portion pressed into the engaging portion.

9. A portable electronic device according to claim 7, wherein the first mounting substrate, the frame, and the second mounting substrate are laminated to each other, and wherein each of the holder, the first mounting substrate, the second mounting substrates, and the frame has an opening for transmitting sound to or from the electroacoustic transducer.

10. A portable electronic device according to claim 9, wherein the holder further holds the electroacoustic transducer at least partially overlapping in the plan view with the first mounting substrate.

11. A portable electronic device according to claim 9, wherein the holder has the engaging portion and the frame has the engaged portion, wherein the engaging portion is the opening of the frame.

12. A portable electronic device according to claim 11, wherein the frame and a part of the holder constitute a flush surface, and wherein the first mounting substrate is arranged on the flush surface.

13. A portable electronic device according to claim 12; wherein the operation portion further comprises a key sheet having a plurality of the keys, and covering the first mounting substrate, wherein the key sheet has an opening connected to the openings of the holder, the first mounting substrate, the second mounting substrate, and the frame.

14. A portable electronic device according to claim 13, wherein the electroacoustic transducer includes a microphone.

15. A portable telephone comprising:
a cover;
a case engaged with the cover to form a space therebetween;
a first mounting substrate in the space,
a second mounting substrate between the first mounting substrate and the casing and electrically connected to the first mounting substrate a communication processor in the space, performing radio communication; and
an electroacoustic transducer for converting from one of an audio and an electric signal into the other;
wherein the second mounting substrate has a flexibility, and comprises a mounting surface on which a component is mounted and an attachment portion which is bent relative to the mounting surface;
wherein the electroacoustic transducer is placed on the attachment portion;
wherein the electric signal is modulated or demodulated by the communication processor.

* * * * *